Aug. 19, 1958     A. V. MITCHELL     2,848,658
LIGHT RESPONSIVE CIRCUIT
Filed April 29, 1955
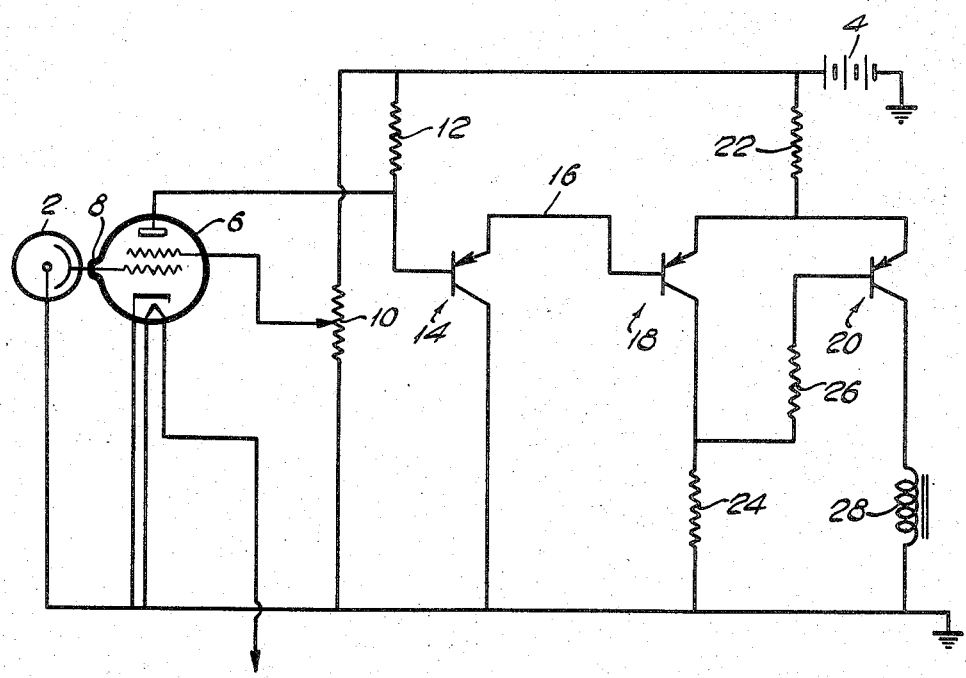
INVENTOR
ALEX V. MITCHELL
BY
Eyre, Mann & Burrows
ATTORNEYS

United States Patent Office 2,848,658
Patented Aug. 19, 1958

2,848,658

LIGHT RESPONSIVE CIRCUIT

Alex V. Mitchell, Bloomfield, N. J., assignor to Tung-Sol Electric Inc., a corporation of Delaware Application April 29, 1955, Serial No. 504,725

5 Claims. (Cl. 317—148.5)

The present invention relates to circuits for control of relays or the like in response to changes in incident light and comprises a novel light responsive circuit which is sensitive, quick and positive in operation and composed of relatively few and simple elements. The new circuit includes a photoelectric tube which may be a simple diode, a multielectrode electronic tube the conduction through which is controlled in response to the intensity of light incident on the photocathode of the photoelectric tube, and a pair of junction type transistors connected in a trigger type circuit to control energization and deenergization of a relay, a third transistor being interposed between the electronic tube and trigger type circuit for control of the latter in response to current flow through the electronic tube.

For a better understanding of the new light responsive circuit reference may be had to the accompanying drawing of which the single figure is a schematic circuit diagram representing one specific embodiment of the invention.

The circuit includes a two element photoelectric tube 2 as, for example, a 922, the anode of which is connected to the negative terminal, indicated by the ground symbol, of a battery 4 of say 12 volts. The cathode of a multielectrode electronic tube 6 is grounded and the No. 1 grid thereof is connected to the photocathode of tube 2. Tube 6 may be a 6AK6 connected as a tetrode but preferably the tube is so constructed that the No. 1 grid thereof is taken off through a top cap to reduce leakage current between terminals of different operating potentials. The separate terminal of the No. 1 grid is indicated diagrammatically in the drawing by the bracket 8. The No. 2 grid of tube 6 is maintained at a positive potential less than that of the battery 4 by connection to a tap on a resistor 10 connected across the battery 4. The anode of tube 6 is connected to the positive terminal of battery 4 through a potential dropping resistor 12. The anode of tube 6 is also connected to the base of a p-n-p junction transistor 14 the collector of which is grounded and the emitter of which is connected through a lead 16 to the base of a second p-n-p junction transistor 18. The emitter of transistor 18 and the emitter of a third transistor 20 are connected through a common potential dropping resistor 22 to the positive terminal of battery 4. The collector of transistor 18 is connected to ground through a load resistor 24 and connected to the base of transistor 20 through a resistor 26 of a magnitude substantially greater than that of load resistor 24. The collector of transistor 20 is connected to ground through the winding 28 of a relay to be controlled in response to light incident on the photocathode of the photoelectric tube 2.

In the above described circuit, transistor 14 is connected as a cathode follower to transmit controlling current to the trigger circuit including transistors 18 and 20. Resistor 12 should be large, say about 50 kilohms and resistor 22 should be small say about 150 ohms. Resistor 26 is preferably many times larger than resistor 24, say ten times larger. Relay 28, unless transistors 18 and 20 are power transistors, is a sensitive relay of a resistance of about 1 kilohm. In the absence of light on the photocathode of tube 2, tube 6 will not pass appreciable current due to the negative charge accumulated on the No. 1 grid thereof by electrons given off thermally from the heated cathode of the tube. Consequently the base of transistor 14 will be substantially at full battery potential and as such potential is higher than that of the emitter, transistor 14 will not conduct. In the absence of current in line 16 interconnecting the emitter of transistor 14 with the base of transistor 18, transistor 18 does not conduct. As the potential of the emitter with respect to the base of transistor 20 is positive, that transistor will conduct. With the values of circuit constants heretofore suggested the emitter current to transistor 20 will be about 6.7 milliamperes and the collector current about 6.5 milliamperes. The base current of transistor 20 will be of the order of 600 microamperes. The potential at the emitters of transistors 18 and 20 will therefore be slightly under +11 volts, that at the base of transistor 20 slightly over +10 volts and that at the collector of transistor 20 about +6.5 volts. The potential at the collector of transistor 18 will be about +1 volt. Relay 28 will be energized and remain energized so long as transistor 20 continues to conduct.

If now light falls on the photocathode of tube 2, the potential of the No. 1 grid of tube 6 will rise as the photoelectric current draws electrons therefrom. Consequently the current through tube 6 will increase with consequent drop in potential at the anode of that tube and at the base of transistor 14. When this potential becomes lower than that of line 16, transistor 14 will start to conduct and consequently transistor 18 will likewise conduct. Conduction by transistor 18 affects transistor 20 in two respects. Due to the common emitter potential dropping resistor 22 the emitter potential of transistor 20 will be lowered and due to the increased potential difference across resistor 24 occasioned by the collector current of transistor 18 the potential at the base of transistor 20 will be raised. When this latter potential exceeds that of the emitter of transistor 20 that transistor will cease conducting and relay 28 will be deenergized and remain deenergized so long as transistors 14 and 18 are conducting as a result of light on the photocathode of tube 2.

When light again ceases to fall upon the photocathode of tube 2 the potential at the base of transistor 14 will rise until the transistor again is rendered non-conductive. The cessation of current in lead 16 thereupon makes transistor 18 non-conductive, cutting out the collector current to that transistor and causing a decrease in potential at the base of transistor 20. Accordingly transistor 20 will thereupon resume conduction and relay 28 will be energized.

From the foregoing description of the operation of the circuit under conditions of assumed values for the various constants it will be apparent that the new circuit has a position quick response to change in light intensity, the relay being either energized or deenergized depending upon the intensity of the light incident on the photocathode of the photoelectric tube. Obviously the particular circuit constants assumed in the foregoing description are illustrative only and not to be taken as essential to the operation of the circuit. Although the relay to be operated has been indicated as a 1 kilohm relay obviously a power relay would be substituted therefor when power transistors are employed. Also, although the relay has been shown so connected as to be energized when no light falls upon the photocathode and to be deenergized when light is present the relay could as well be in the collector circuit of transistor 18 in place of the load resistor 24 in which case the relay would be normally deenergized rather than energized. Other modifications will be apparent to those skilled in the art.

The following is claimed:

1. A circuit for coupling the light sensitive element of photoelectric means with a relay to be controlled in response to light incident on the light sensitive element, comprising an electronic tube having at least an anode, a control grid and a cathode, said grid being connected to said light sensitive element, a source of energizing potential for said circuit having positive and negative terminals, said anode being connected through a potential dropping resistor to said positive terminal of said source and said cathode being connected to said negative terminal, a p–n–p junction transistor having its collector connected to said cathode, and its base connected to said anode, a second p–n–p junction transistor having its base connected to the emitter of said first transistor, its collector connected to said cathode through a load resistor and its emitter connected to said positive terminal through a second potential dropping resistor, and a third p–n–p junction transistor having its base connected through a resistor to the collector of said second transistor, its emitter connected to the emitter of said second transistor and its collector connected to said cathode through the winding of the relay to be controlled.

2. The circuit according to claim 1 wherein said resistor interconnecting the collector of said second transistor with the base of said third transistor has a substantially higher resistance than that of said load resistor.

3. A circuit for coupling a condition responsive direct current device with a device to be controlled which comprises a direct current source of energizing potential, a multi-electrode tube and a dropping resistor connected in series across said source, means connecting said condition responsive device to said multi-electrode tube to control the current through said tube in response to the current passed by said device, a trigger circuit comprising first and second junction transistors, the emitters of which are connected to the high potential terminal of said source through a common impedance, the collectors of which are connected to the other terminal of said source through separate loads of which one is the device to be controlled, the base of said second transistor being connected to the collector of the first transistor through a resistor whereby said second transistor conducts only when said first transistor is not conducting and a cathode follower transistor circuit having its input connected to the output of said tube so as to be responsive to current flow through said multi-electrode tube and dropping resistor and its output connected to the base of said first transistor to render the same non-conducting when the current through said tube reduces below a predetermined value.

4. The coupling circuit according to claim 3 wherein said dropping resistor is connected between the anode of said tube and the positive terminal of said source and said cathode follower circuit comprises a third junction transistor the base of which is connected to the anode of said tube, the collector of which is connected to the other terminal of said source and the emitter of which is connected to the base of said first transistor.

5. The coupling circuit according to claim 3 wherein said resistor interconnecting the base of the second transistor with the collector of the first transistor has a substantially higher impedance than that of either load.

References Cited in the file of this patent

UNITED STATES PATENTS

| | | |
|---|---|---|
| 2,459,852 | Summerhayes | Jan. 25, 1949 |
| 2,515,630 | Chang | July 18, 1950 |
| 2,614,227 | Bordewieck et al. | Oct. 14, 1952 |
| 2,641,717 | Toth | June 9, 1953 |
| 2,730,629 | Atkins | Jan. 10, 1956 |

OTHER REFERENCES

Schmitt: "A Thermionic Trigger," Journal of Scientific Instruments, vol. 15 (1938), pages 24–26.